(12) United States Patent
Kawana

(10) Patent No.: US 7,733,576 B2
(45) Date of Patent: Jun. 8, 2010

(54) TWO-GROUP ZOOM PROJECTION LENS AND PROJECTION DISPLAY

(75) Inventor: Masanao Kawana, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 217 days.

(21) Appl. No.: 11/520,826

(22) Filed: Sep. 14, 2006

(65) Prior Publication Data
US 2007/0058267 A1    Mar. 15, 2007

(30) Foreign Application Priority Data
Sep. 14, 2005    (JP) .................... P2005-266667

(51) Int. Cl.
G02B 15/14    (2006.01)
(52) U.S. Cl. .................... 359/691; 359/680; 359/649
(58) Field of Classification Search .............. 359/691, 359/680–682
See application file for complete search history.

(56) References Cited
U.S. PATENT DOCUMENTS
5,781,349 A * 7/1998 Sugawara .................... 359/691
5,936,780 A * 8/1999 Chuang et al. ............... 359/691

FOREIGN PATENT DOCUMENTS
JP    2004-271668 A    9/2004

* cited by examiner

Primary Examiner—Jordan M. Schwartz
(74) Attorney, Agent, or Firm—Birch, Stewart, Kolasch & Birch, LLP (57) ABSTRACT

A two-group zoom projection lens is provided and includes: in order from a magnification side, a first lens group having a negative refractive power; and a second lens group having a positive refractive power, the second lens group including a front group and a rear group in order from the magnification side, the front group including a group having at least two positive lenses and a group having at least one negative lens in order from the magnification side, the rear group including a group having at least one negative lenses and a group having at least two positive lenses in order from the magnification side. The front group includes a negative lens having a concave surface directed toward the magnification side, the rear group includes a negative lens having a concave surface directed toward a reduction side, and the projection lens satisfies conditional expressions specified in the specification.

8 Claims, 9 Drawing Sheets

WIDE-ANGLE POSITION

TELEPHOTO POSITION

WIDE-ANGLE POSITION

TELEPHOTO POSITION

WIDE-ANGLE POSITION

TELEPHOTO POSITION

WIDE-ANGLE POSITION

TELEPHOTO POSITION

FIG. 9

TWO-GROUP ZOOM PROJECTION LENS AND PROJECTION DISPLAY

This application claims foreign priority from Japanese Patent Application No. 2005-266667, filed Sep. 14, 2005, the entire disclosure of which is herein incorporated by reference.

BACKGROUND OF THE INVENTION

1. Field of the Invention

The present invention relates to a two-group zoom projection lens to be mounted on a projection display and to such a projection display. Particularly, the present invention can be used as a projection lens for use on a projector that employs a DMD (digital micro-mirror device) for its light valve.

2. Description of Background Art

Recently, the projectors (projection displays) using DMD displays have becoming popular in addition to liquid crystal displays. The DMD uses highly-reflective rectangular microscopic mirrors capable of tilting in the range of some 10 degrees or more, to control the reflective direction of the light from the light source in accordance with an input video signal and to focus only a desired portion of reflection light onto a screen thereby projecting the video image. This can be effected by digitally controlling, quite independently, the several millions or more mirrors arranged two-dimensionally on a substrate. Each mirror corresponds to one pixel in a video image.

Meanwhile, differently from the liquid crystal display, the DMD is low in light loss because of no need to polarize illumination light, and hence excellent in the correctness of continuous-tone representation. The projector using such an advantageous DMD requires a projection lens having a favorable lens characteristic in order to obtain a clear high-definition projection image in accordance with the DMD. In an attempt to meet the requests, there is proposed a projection lens capable of making a correction for aberrations at a wide angle-of-view (see JP-A-2004-271668).

For a projector using a DMD, the projection lens is necessarily matched to the characteristic and requirement of the projector. Accordingly, the first requirement is for high performance and small size. Furthermore, naturally required is suitability in correction, at wide angle-of-view, for aberrations, including chromatic aberration and distortion. In the recent that high-definition color images are particularly needed, required are those that are favorable in chromatic aberration.

SUMMARY OF THE INVENTION

An object of an illustrative, non-limiting embodiment of the invention is to provide a two-group zoom projection lens, which is small in size and wide in angle-of-view but allowed to properly correct aberrations, and to provide a projection display.

One aspect of the present invention is a two-group zoom projection lens comprising: in order from a magnification side, a first lens group having a negative refractive power; and a second lens group having a positive refractive power, the second lens group comprising a front group and a rear group in order from the magnification side, the front group comprising a group having at least two positive lenses and a group having at least one negative lens in order from the magnification side, the rear group comprising a group having at least one negative lenses and a group having at least two positive lenses in order from the magnification side. The at least one negative lens in the front group comprises a lens having a concave surface directed toward the magnification side, the at least one negative lens in the rear group comprises a lens having a concave surface directed toward a reduction side, and the two-group zoom projection lens satisfies conditional expressions (1) to (3):

$$n_{2i} > 1.75 \tag{1}$$

$$0.8 < D_2/f_2 < 1.2 \tag{2}$$

$$0.6 < f_w/f_2 < 0.8 \tag{3}$$

where $n_{2i}$ represents a refractive index with respect to a d-line of a glass material comprising the negative lens in the second lens group and i is a lens number counted from the magnification side, $D_2$ represents an overall length of the second lens group, $f_2$ represents a focal length of the second lens group, and $f_w$ represents a focal length at a wide-angle end of the overall system of the two-group zoom projection lens.

Incidentally, conditional expression (3) may be given as $0.65 < f_w/f_2 < 0.75$.

Meanwhile, the first lens group may be arranged with a positive lens, a negative meniscus lens having a convex surface directed toward the magnification side, a negative lens, a positive lens, and a negative lens in order from the magnification side, to satisfy conditional expression (4) given below, $$0.6 < f_w/|f_1| < 0.9 \tag{4}$$

where $f_1$ represents a focal length of the first lens group.

Meanwhile, the first lens group may be arranged with a positive lens, a negative meniscus lens having a convex surface directed toward the magnification side, a negative lens, and a positive lens in order from the magnification side, to satisfy conditional expression (4) given in the above.

Another aspect of the present invention is projection display comprising: a light source; a light valve; an illumination optical section that guides a luminous flux from the light source to the light valve; and a two-group zoom projection lens as the above-mentioned. The light valve optically modulates the luminous flux, and the two-group zoom projection lens projects the luminous flux onto a screen.

BRIEF DESCRIPTION OF THE DRAWINGS

The features of the invention will appear more fully upon consideration of the exemplary embodiments of the inventions, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, a two-group zoom projection is made as a retro-focus type by arranging the first lens group having a negative refractive power, thus achieving the increase of angle-of-view.

Meanwhile, the second lens group is divided as a front group and a rear group, to provide a symmetric structure with respect to the optical-axis direction. By directing the concave surface of the negative lens of the front group toward the magnification side and the concave surface of the negative lens of the rear group toward the reduction side to thereby arrange the two concave surfaces mutually reverse, it is possible to suppress the occurrence of off-axis aberration, including distortion or lateral color.

Furthermore, by satisfying the conditional expressions (1) to (4), aberrations can be further made favorable while achieving size reduction.

Figure 1:
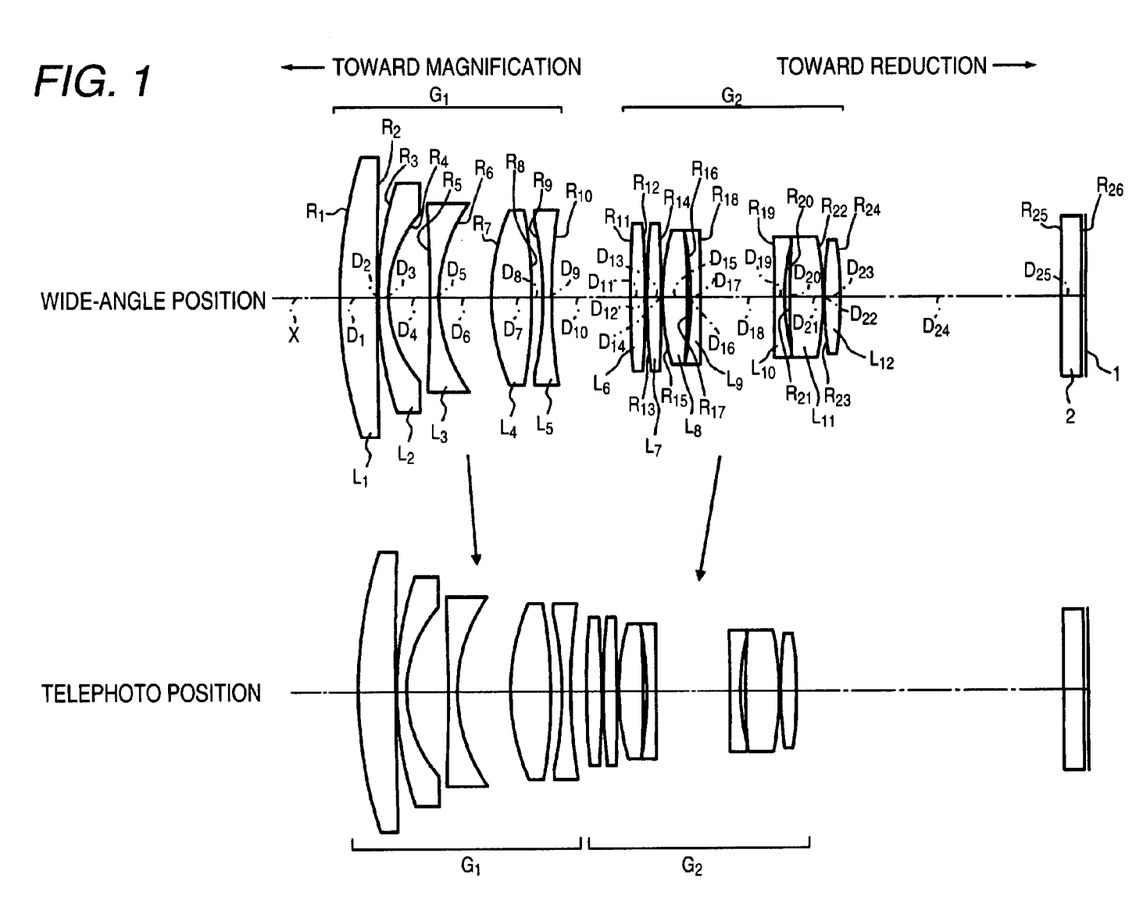
FIG. 1 is a schematic view showing a two-group zoom projection lens according to an exemplary embodiment 1 of the present invention.

While referring to the drawings, exemplary embodiments of the invention will be explained in detail. FIG. 1 shows an embodiment (showing representatively embodiment 1) of a two-group zoom projection lens arranged with a first lens group $G_1$ having a negative refractive power, a second lens group $G_2$ having a positive refractive power, a cover glass (filter) 2 and a DMD 1, in the order from a magnification side (i.e., a projection side or screen side on which images are projected). Note that X in the figure represents an optical axis.

Here, the first lens group $G_1$ has a positive first lens $L_1$, a second lens $L_2$ made as a negative meniscus lens having a convex surface directed toward the magnification side, a negative third lens $L_3$, a positive fourth lens $L_4$, and a negative fifth lens $L_5$, in the order from the magnification side. Meanwhile, the second lens group $G_2$ has, in the front group, a positive sixth lens $L_6$, a positive seventh lens $L_7$, a positive eighth lens $L_8$ and a negative ninth lens $L_9$ having a concave surface directed toward the magnification side, in the order from the magnification side, and, in the rear group, a negative tenth lens $L_{10}$ having a concave surface directed toward the reduction side, a positive eleventh lens $L_{11}$ and a positive twelfth lens $L_{12}$, in the order from the magnification side.

Incidentally, in place of the above structure, the first lens group $G_1$ may be in a four-lens arrangement having a positive first lens $L_1$, a second lens $L_2$ made as a negative meniscus lens having a convex surface directed toward the magnification side, a negative third lens $L_3$ and a positive fourth lens $L_4$, in the order from the magnification side.

The second lens group $G_2$ is not limited in lens arrangement to the above but may be added with one or more negative lenses or with one or more positive lenses.

In the second lens group $G_2$, the front and rear group are roughly in a symmetric arrangement. By directing mutually reverse the concave surface of the front-group negative lens (ninth lens $L_9$) toward the magnification side and the concave surface of the rear-group negative lens (tenth lens $L_{10}$) toward the reduction side (i.e., an opposite side to the magnification side), it is possible to suppress the occurrence of off-axis aberration, e.g. distortion or lateral color.

The two-group zoom projection lens in this embodiment is constructed with a zoom function by allowing to move the two lens group, i.e. the first and second lens groups $G_1$, $G_2$. Here, for changing the magnification from the wide-angle to telephoto end, the first lens group $G_1$ is structured to move steplessly from the magnification toward reduction side while the second lens group $G_2$ is structured to move steplessly from the reduction toward magnification side.

Explanation is now made on the technical significance of the conditional expressions (1) to (4) noted before.

The conditional expression (1) is to define the refractive index of the negative lenses in the second lens group $G_2$. By satisfying the conditional expression (1), correction is to be properly made for spherical and chromatic aberrations.

The conditional expression (2) is to properly establish a power distribution over the second lens group $G_2$. Where departing from the range of the conditional expression (2), aberrations, particularly spherical aberration, worsens.

The conditional expression (3) is to properly establish a power distribution over the lens system overall. When going above the upper limit, the occurrence of aberration increases on the second lens group $G_2$, which makes it difficult to correct the lens system overall for aberration. Meanwhile, when going below the lower limit, the spacing is excessively great between the first and second lens groups $G_1$ and $G_2$, which makes it difficult to reduce the size of the lens system overall.

The conditional expression (4) is to properly establish a power distribution over the lens system overall. When going above the upper limit, the occurrence of aberration increases on the first lens group $G_1$, which makes it difficult to correct the lens system overall for aberration. Meanwhile, when going below the lower limit, the spacing is excessively great between the first and second lens groups $G_1$ and $G_2$, which makes it difficult to reduce the size of the lens system overall.

Figure 9:
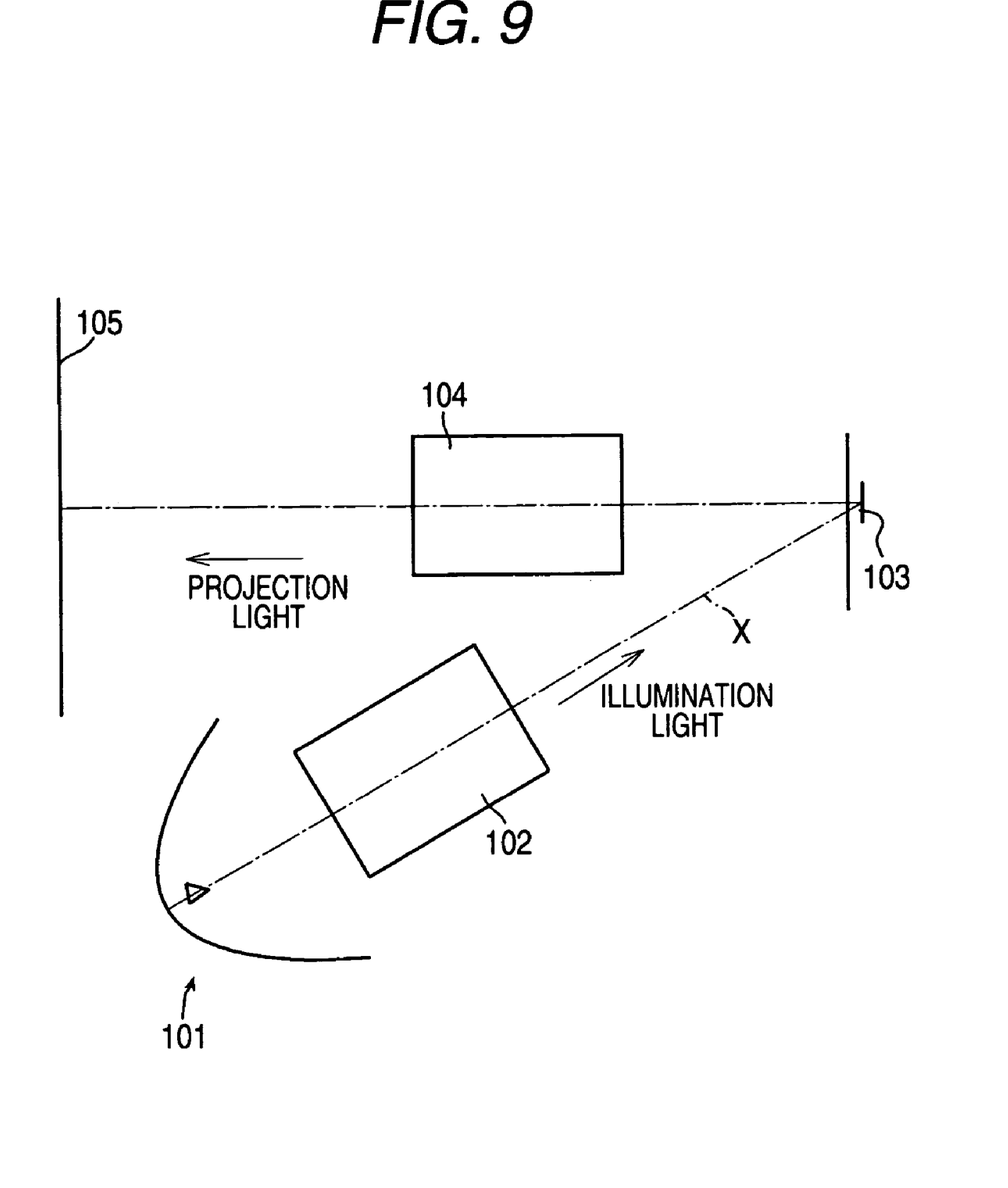
FIG. 9 is a schematic construction view of a projection display using a two-group zoom projection lens according to an aspect of the invention.

Explanation is now made briefly on an embodiment of a projection display according to the invention. FIG. 9 is a schematic construction diagram of a projection display according to the present embodiment.

As shown in FIG. 9, the luminous flux emitted from a light source 101 is selectively converted into respective portions of three primary colors (R, G, B) by a color wheel, not shown, in a chronological fashion. Those portions of light are uniformised in light-amount distribution on the sectional plane vertical to the optical axis of the luminous flux thereof by an illumination system 102, then being illuminated to a DMD (a light valve) 103. In accordance with the color switching of the incident light, the DMD 103 performs a modulation for the color by switchover. The light, modulated properly by the DMD 103, enters a two-group projection lens 104 and finally reaches a screen 105.

Note that the projection display, shown in FIG. 9, illustrates the first embodiment of the invention but can be modified in various ways. For example, in place of providing a single-plate DMD, three DMDs for respective colors of light may be provided to modulate the colors of R, G and B simultaneously. In such a case, a color separation/combining prism, not shown, is arranged between the two-group zoom projection lens 104 and the DMD 103.

The two-group zoom projection lens in the invention will be further explained in the following by use of exemplary embodiments.

Embodiment 1

In FIG. 1, there is shown a schematic arrangement of a two-group zoom projection lens according to an exemplary embodiment 1. The two-group zoom projection lens is arranged with a first lens group $G_1$ having a negative refractive power and a second lens group $G_2$ having a positive refractive power, in the order from the magnification side.

Here, the first lens group $G_1$ has a first lens $L_1$ made as a positive meniscus lens having a convex surface directed toward the magnification side, a second lens $L_2$ made as a negative meniscus lens having a convex surface directed toward the magnification side, a third lens $L_3$ made as a double-concave lens, a fourth lens $L_4$ made as a double-convex lens and a fifth lens $L_5$ made as a double-concave lens, in the order from the magnification side. Meanwhile, the second lens group $G_2$, has, in a front group, a sixth lens $L_6$ made as a double-convex lens, a seventh lens $L_7$ made as a double-convex lens, an eighth lens $L_8$ made as a double-convex lens, and a ninth lens $L_9$ made as a negative meniscus lens having a concave surface directed toward the magnification side, in the order from the magnification side. A rear group has a tenth lens $L_{10}$ made as a double-concave lens, an eleventh lens $L_{11}$ made as a double-convex lens, and a twelfth lens $L_{12}$ made as a double-convex lens, in the order from the magnification side.

The second lens group $G_2$ is separated longitudinally to provide a nearly symmetric structure. By the magnification-side concave surface of the ninth lens $L_9$ of the front group and the reduction-side concave surface of the tenth lens $L_{10}$ of the rear group, it is possible to suppress the occurrence of off-axis aberration, e.g. distortion or lateral color.

In Table 1, there are shown a radius of curvature R (mm) of each lens surface of the two-group zoom projection lens, a center thickness of each lens and an air spacing (hereinafter, generally referred to as an on-axis plane spacing) D (mm) between the lenses, and a refractive index N and Abbe number ν value as to the d-line on the lens. Note that the numerals in the table represent the order from the magnification side. Meanwhile, there are shown in the middle part of Table 1 the values of focal length f, back-focus distance bf, Fno. and angle-of-field 2ω.

TABLE 1

| Plane Number | R | D | $N_d$ | $v_d$ |
|---|---|---|---|---|
| 1 | 67.798 | 5.64 | 1.72916 | 54.7 |
| 2 | 948.518 | 0.16 | | |
| 3 | 52.956 | 1.50 | 1.79952 | 42.2 |
| 4 | 18.621 | 6.30 | | |
| 5 | −240.246 | 1.30 | 1.72916 | 54.7 |
| 6 | 23.731 | 7.99 | | |
| 7 | 33.142 | 6.00 | 1.80518 | 25.4 |
| 8 | −75.239 | 1.64 | | |
| 9 | −53.791 | 1.30 | 1.75520 | 27.5 |
| 10 | 84.002 | 11.84-2.38 | | |
| 11 | 142.366 | 2.29 | 1.77250 | 49.6 |
| 12 | −142.366 | 0.20 | | |
| 13 | 105.192 | 2.15 | 1.80610 | 40.9 |
| 14 | −231.957 | 0.20 | | |
| 15 | 36.478 | 3.71 | 1.51633 | 64.1 |

TABLE 1-continued

| Plane Number | R | D | $N_d$ | $v_d$ |
|---|---|---|---|---|
| 16 | −137.485 | 0.51 | | |
| 17 | −55.930 | 1.49 | 1.84666 | 23.8 |
| 18 | −632.267 | 10.96 | | |
| 19 | −369.193 | 1.50 | 1.80518 | 25.4 |
| 20 | 33.076 | 0.76 | | |
| 21 | 137.656 | 4.98 | 1.72916 | 54.7 |
| 22 | −45.942 | 0.20 | | |
| 23 | 64.041 | 2.40 | 1.69680 | 55.5 |
| 24 | −64.041 | 33.00-39.83 | | |
| 25 | ∞ | 3.00 | 1.48749 | 70.2 |
| 26 | ∞ | | | | f = 21.20-27.48, bf = 35.44, Fno = 2.38-2.80, 2ω = 59.65°-47.37°

| | Conditional Expression (1) | Conditional Expression (2) | Conditional Expression (3) | Conditional Expression (4) |
|---|---|---|---|---|
| $n_{24}$ = 1.84666<br>$n_{25}$ = 1.80518 | 1.026 | 0.694 | | 0.738 |

According to the two-group zoom projection lens in the embodiment 1, the conditional expressions (1) to (4) are satisfied as shown in the lower part of Table 1. Incidentally, the lens system is given an overall length (distance between an object-side surface of the first lens L1 and an image-side surface of final lens: true for the following) of 75.0 mm.

Figure 2:
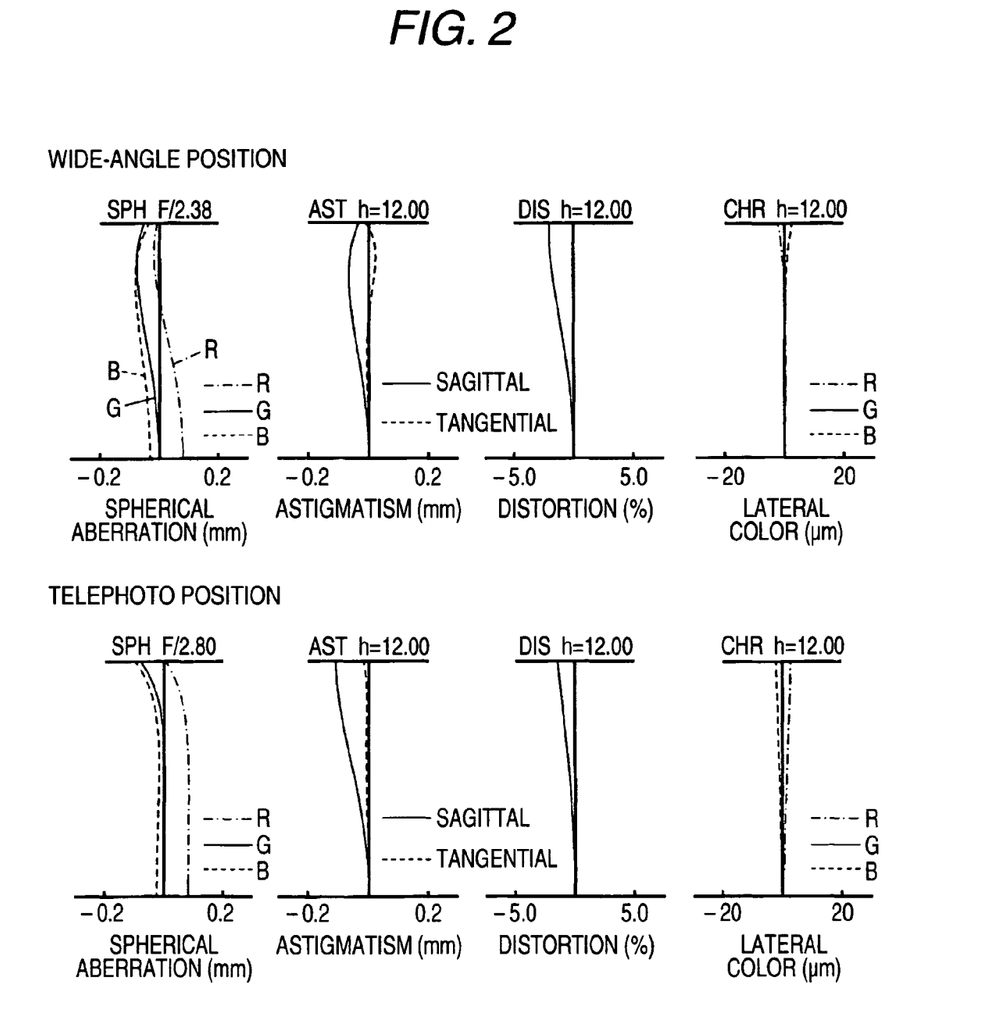
FIG. 2 is an aberration diagram illustrating aberrations (spherical aberration, astigmatism, distortion and lateral color) on the two-group zoom projection lens according to the embodiment 1.

FIG. 2 is an aberration diagram illustrating a spherical aberration, an astigmatism, a distortion and a lateral color on the two-group zoom projection lens according to the embodiment 1.

As apparent from the aberration diagram, the two-group zoom projection lens in the embodiment 1 is capable of making a favorable correction for aberrations, particularly lateral color.

Embodiment 2

Figure 3:
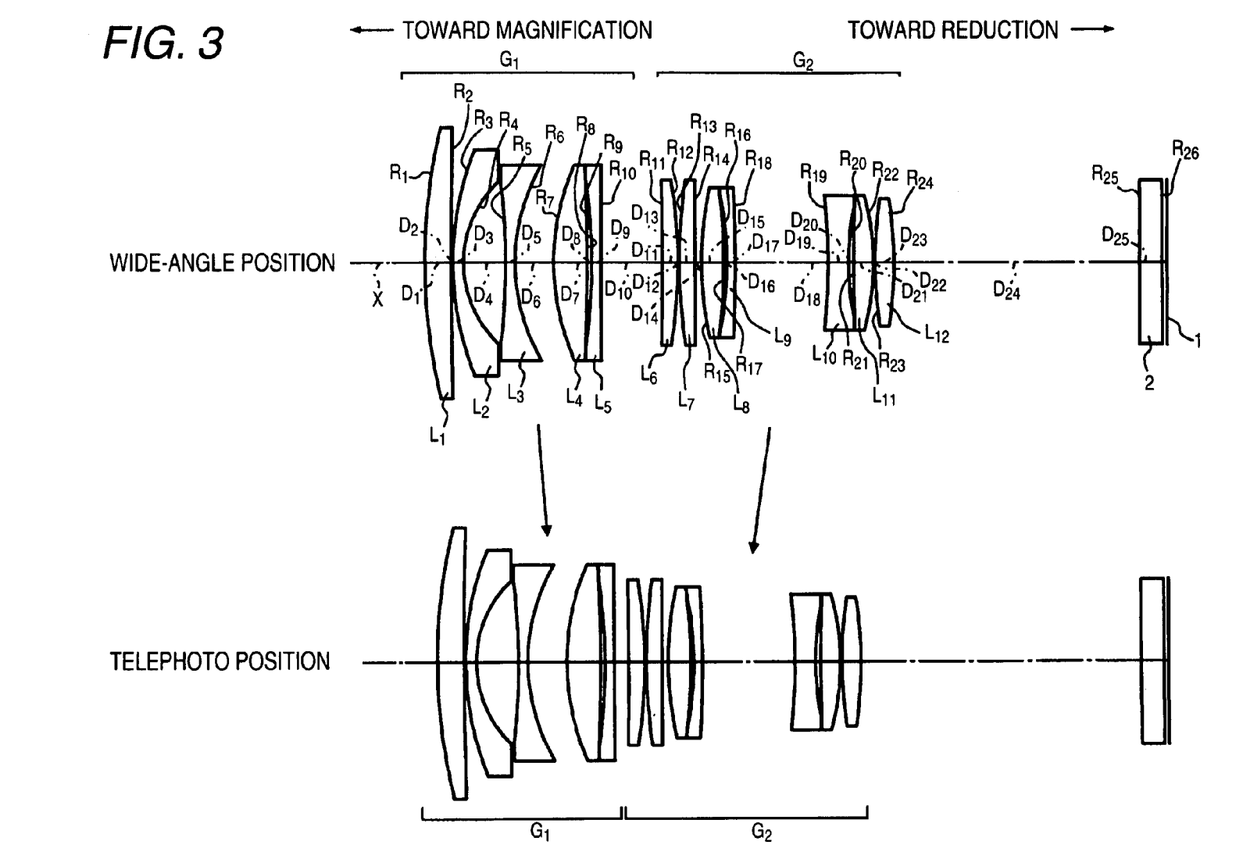
FIG. 3 is a schematic view showing a two-group zoom projection lens according to an exemplary embodiment 2 of the present invention.

In FIG. 3, there is shown a schematic structure of a two-group zoom projection lens according to an exemplary embodiment 2. In this embodiment, the explanations duplicated with those of the embodiment 1 are omitted.

The two-group zoom projection lens in the embodiment 2 is different in the lens arrangement of the second lens group $G_2$, as compared to that of the embodiment 1. Specifically, the difference lies in that the second lens group $G_2$ has the lens closest to the magnification side, in the front group, is given as a sixth lens $L_6$ made as a positive meniscus lens having a concave surface directed toward the magnification side.

The second lens group $G_2$ is separated longitudinally to provide nearly a symmetric structure. By the magnification-side concave surface of the ninth lens $L_9$ of the front group and the reduction-side concave surface of the tenth lens $L_{10}$ of the rear group, it is possible to suppress the occurrence of off-axis aberration, including distortion or lateral color.

In Table 2, there are shown a radius of curvature R (mm) of each lens surface of the two-group zoom projection lens, a center thickness of each lens and an air spacing (hereinafter, generally referred to as an on-axis plane spacing) D (mm) between the lenses, and a refractive index N and Abbe number ν value at the d-line on the lens. Note that the numerals in the table represent the order from the magnification side. Meanwhile, there are shown in the middle part of Table 2 the values of focal length f, back-focus distance bf, Fno. and angle-of-field 2ω.

TABLE 2

| Plane Number | R | D | $N_d$ | $v_d$ |
|---|---|---|---|---|
| 1 | 74.336 | 3.57 | 1.77250 | 49.6 |
| 2 | 831.593 | 0.20 | | |
| 3 | 39.814 | 1.44 | 1.80610 | 40.9 |
| 4 | 14.811 | 5.65 | | |
| 5 | −91.273 | 1.26 | 1.71300 | 53.9 |
| 6 | 25.635 | 5.18 | | |
| 7 | 31.826 | 4.53 | 1.80518 | 25.4 |
| 8 | −275.807 | 0.58 | | |
| 9 | −77.639 | 1.26 | 1.75520 | 27.5 |
| 10 | 1421.383 | 8.23-1.96 | | |
| 11 | −748.693 | 2.15 | 1.77250 | 49.6 |
| 12 | −66.416 | 0.20 | | |
| 13 | 74.493 | 2.15 | 1.80100 | 35.0 |
| 14 | −2736.302 | 0.80 | | |
| 15 | 45.232 | 3.06 | 1.56384 | 60.7 |
| 16 | −76.845 | 0.39 | | |
| 17 | −45.186 | 1.09 | 1.84666 | 23.8 |
| 18 | −245.645 | 12.49 | | |
| 19 | −79.877 | 2.75 | 1.80518 | 25.4 |
| 20 | 39.608 | 0.64 | | |
| 21 | 208.768 | 2.71 | 1.71300 | 53.9 |
| 22 | −33.037 | 0.20 | | |
| 23 | 57.598 | 2.53 | 1.69680 | 55.5 |
| 24 | −56.430 | 33.00-37.66 | | |
| 25 | ∞ | 3.00 | 1.48749 | 70.2 |
| 26 | ∞ | | | | f = 21.15-25.33, bf = 35.44, Fno = 2.38-2.67, 2ω = 55.93°-47.32°

| Conditional Expression (1) | Conditional Expression (2) | Conditional Expression (3) | Conditional Expression (4) |
|---|---|---|---|
| $n_{24}$ = 1.84666 $n_{25}$ = 1.80518 | 1.054 | 0.716 | 0.780 |

According to the two-group zoom projection lens in the embodiment 2, the conditional expressions (1) to (4) are satisfied as shown in the lower part of Table 2. Incidentally, the lens system is given an overall length of 63.0 mm.

Figure 4:
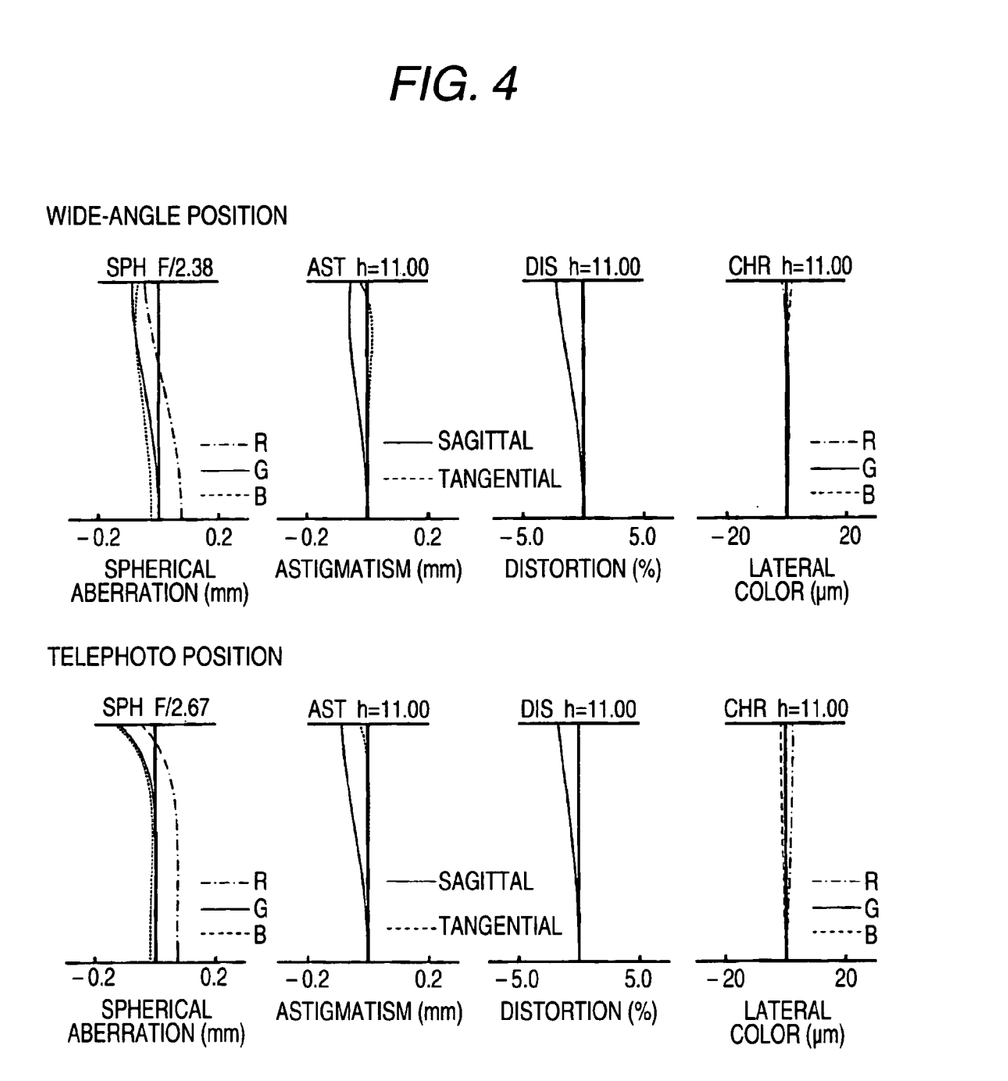
FIG. 4 is an aberration diagram illustrating aberrations (spherical aberration, astigmatism, distortion and lateral color) on the two-group zoom projection lens according to the embodiment 2.

FIG. 4 is an aberration diagram illustrating a spherical aberration, an astigmatism, a distortion and a lateral color on the two-group zoom projection lens according to the embodiment 2. Note that, in the astigmatism diagram, there is shown an aberration as to sagittal and tangential image surfaces. In the aberration diagram, h designates an image height.

As apparent from the aberration diagram, the two-group zoom projection lens in the embodiment 2 is capable of making a favorable correction for aberrations, particularly lateral color.

Embodiment 3

Figure 5:
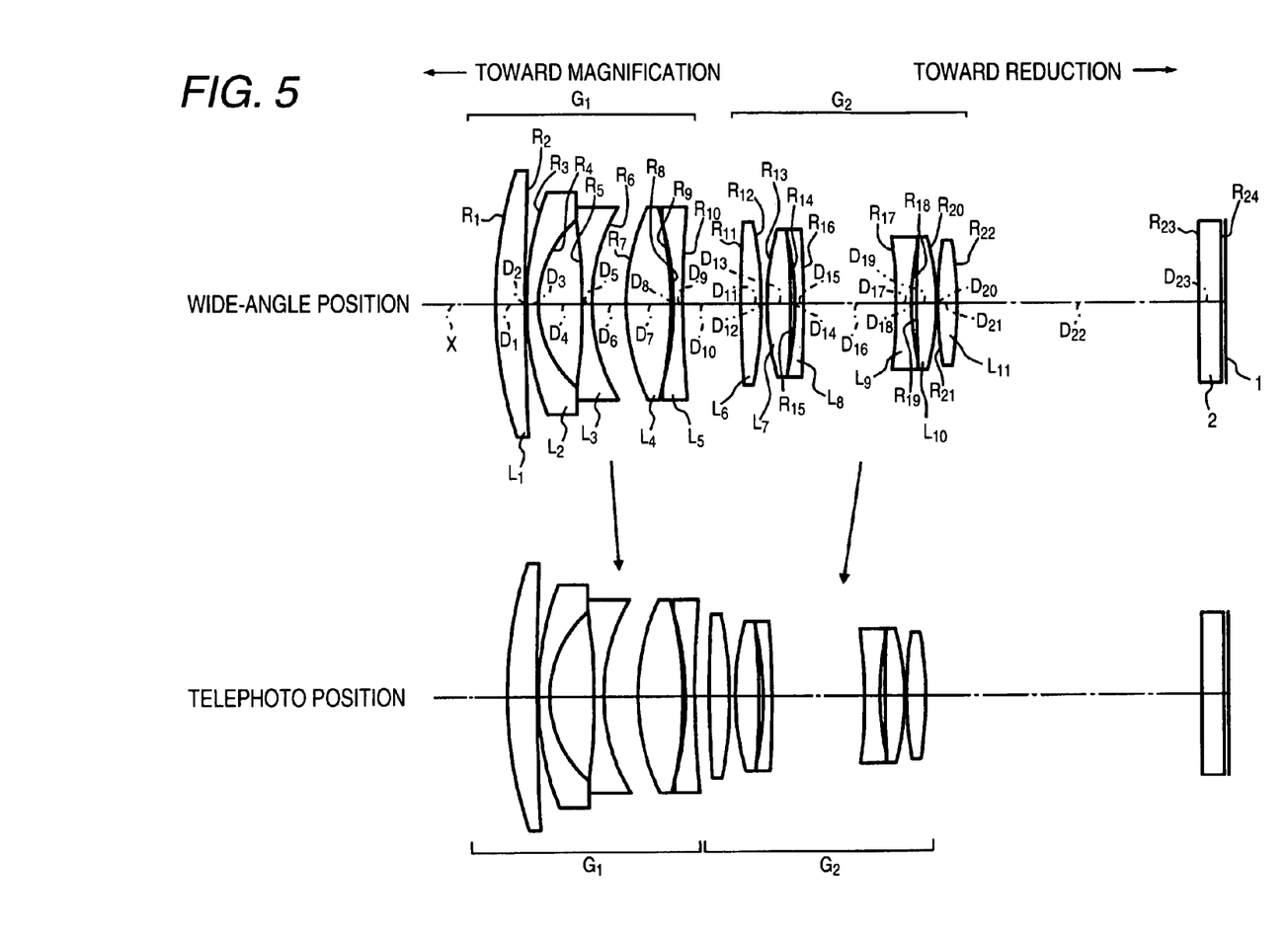
FIG. 5 is a schematic view showing a two-group zoom projection lens according to an exemplary embodiment 3 of the present invention.

In FIG. 5, there is shown a schematic arrangement of a two-group zoom projection lens according to an exemplary embodiment 3. In this embodiment, the explanations duplicated with those of the embodiment 1 are omitted.

The two-group zoom projection lens in the embodiment 3 is different in the lens arrangement of the second lens group $G_2$, as compared to that of the embodiment 1. Particularly, the second lens group $G_2$ in the embodiment 1 had lenses in the number of four in the front group thereof whereas that in the present embodiment is arranged with three. In the second lens group $G_2$, the front group is concretely arranged with a sixth lens $L_6$ made as a double-convex lens, a seventh lens $L_7$ made as a double-convex lens, and an eighth lens $L_8$ made as a negative meniscus lens having a concave surface directed toward the magnification side, in the order from the magnification side. The rear group is concretely arranged with a ninth lens $L_9$ made as a double-concave lens, a tenth lens $L_{10}$ made as a double-convex lens, and an eleventh lens $L_{11}$ made as a convex-at-both-side lens, in the order from the magnification side.

The second lens group $G_2$ is separated longitudinally into nearly a symmetric structure. By the magnification-side concave surface of the eighth lens $L_8$ of the front group and the reduction-side concave surface of the ninth lens $L_9$ of the rear group, it is possible to suppress the occurrence of off-axis aberration, e.g. distortion or lateral color.

In Table 3, there are shown a radius of curvature R (mm) of each lens surface of the two-group zoom projection lens, a center thickness of each lens and an air spacing (hereinafter, generally referred to as an on-axis plane spacing) D (mm) between the lenses, and a refractive index N and Abbe number ν value at the d-line of the lens. Note that the numerals in the table represent the order from the magnification side. Meanwhile, there are shown in the middle part of Table 3 the values of focal length f, back-focus distance bf, Fno. and angle-of-field 2ω.

TABLE 3

| Plane Number | R | D | $N_d$ | $v_d$ |
|---|---|---|---|---|
| 1 | 57.945 | 3.97 | 1.77250 | 49.6 |
| 2 | 365.321 | 0.20 | | |
| 3 | 40.960 | 1.60 | 1.83400 | 37.2 |
| 4 | 14.890 | 6.04 | | |
| 5 | −79.416 | 1.26 | 1.71300 | 53.9 |
| 6 | 24.955 | 4.69 | | |
| 7 | 29.843 | 6.22 | 1.80518 | 25.4 |
| 8 | −51.579 | 0.35 | | |
| 9 | −40.481 | 1.26 | 1.75520 | 27.5 |
| 10 | 143.804 | 7.99-1.99 | | |
| 11 | 169.932 | 2.80 | 1.80610 | 40.9 |
| 12 | −55.267 | 0.77 | | |
| 13 | 36.061 | 3.24 | 1.56883 | 56.3 |
| 14 | −97.685 | 0.58 | | |
| 15 | −41.961 | 1.20 | 1.84666 | 23.8 |
| 16 | −152.983 | 12.59 | | |
| 17 | −70.177 | 2.10 | 1.80518 | 25.4 |
| 18 | 39.554 | 0.66 | | |
| 19 | 222.909 | 2.70 | 1.71300 | 53.9 |
| 20 | −33.043 | 0.20 | | |
| 21 | 52.153 | 2.64 | 1.69680 | 55.5 |
| 22 | −52.153 | 33.00-37.65 | | |
| 23 | ∞ | 3.00 | 1.48749 | 70.2 |
| 24 | ∞ | | | | f = 21.20-25.39, bf = 35.44, Fno = 2.38-2.67, 2ω = 55.55°-47.19°

| Conditional Expression (1) | Conditional Expression (2) | Conditional Expression (3) | Conditional Expression (4) |
|---|---|---|---|
| $n_{24}$ = 1.84666 $n_{25}$ = 1.80518 | 1.019 | 0.733 | 0.796 |

According to the two-group zoom projection lens in the embodiment 3, the conditional expressions (1) to (4) are satisfied as shown in the lower part of Table 3. Incidentally, the lens system is given an overall length of 63.0 mm.

Figure 6:
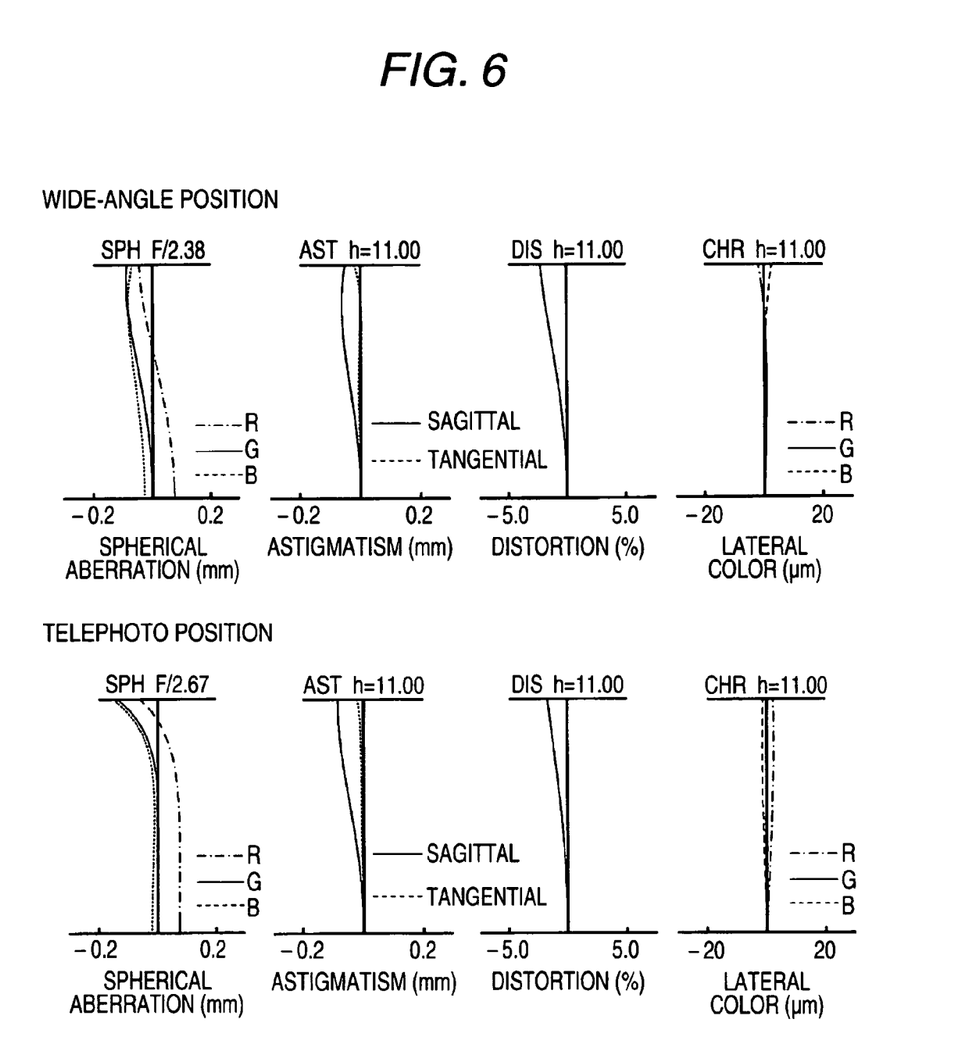
FIG. 6 is an aberration diagram illustrating aberrations (spherical aberration, astigmatism, distortion and lateral color) on the two-group zoom projection lens according to the embodiment 3.

FIG. 6 is an aberration diagram illustrating a spherical aberration, an astigmatism, a distortion and a lateral color on the two-group zoom projection lens according to the embodiment 3. Note that, in the astigmatism diagram, there is shown aberration as to sagittal and tangential image surfaces. In the aberration diagram, h designates an image height.

As apparent from the aberration diagram, the two-group zoom projection lens in the embodiment 3 is capable of making a favorable correction for aberrations, particularly lateral color.

Embodiment 4

Figure 7:
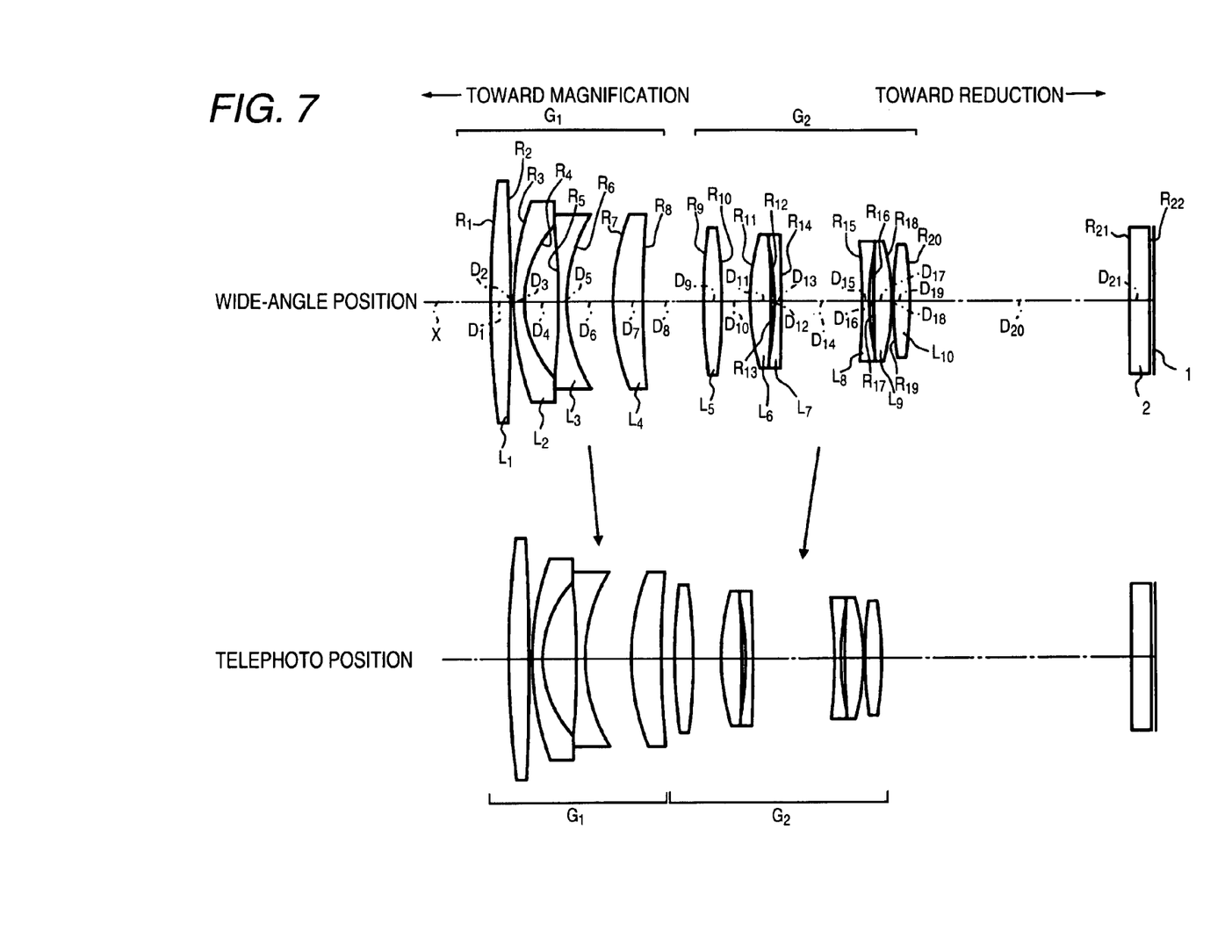
FIG. 7 is a schematic view showing a two-group zoom projection lens according to an exemplary embodiment 4 of the present invention.

In FIG. 7, there is shown a schematic arrangement of a two-group zoom projection lens according to an exemplary embodiment 4. In this embodiment, the explanations duplicated with those of the embodiment 1 are omitted.

The two-group zoom projection lens in the embodiment 4 is different in the lens arrangement of both the first and second lens groups $G_1$, $G_2$, as compared to that of the embodiment 1. Particularly, the first lens group $G_1$ in the embodiment 1 had lenses in the number of five whereas that in the present embodiment is arranged with four. Furthermore, in the second lens group $G_2$, the front group had four lenses whereas that in this embodiment is arranged with three lenses. Here, the first lens group $G_1$ is concretely arranged with a first lens $L_1$ made as a double-convex lens, a second lens $L_2$ made as a negative meniscus lens having a convex surface directed toward the magnification side, a third lens $L_3$ made as a double-concave lens, and a fourth lens $L_4$ made as a positive meniscus lens having a convex surface directed toward the magnification side, in the order from the magnification side. Meanwhile, in the second lens group $G_2$, the front group is concretely arranged with a fifth lens $L_5$ made as a double-convex lens, a sixth lens $L_6$ made as a double-convex lens, and a seventh lens $L_7$ made as a negative meniscus lens having a concave surface directed toward the magnification side, in the order from the magnification side. The rear group is concretely arranged with an eighth lens $L_8$ made as a double-concave lens, a ninth lens $L_9$ made as a double-convex lens, and a tenth lens $L_{10}$ made as a double-convex lens, in the order from the magnification side.

The second lens group $G_2$ is separated longitudinally into nearly a symmetric structure. By the magnification-side concave surface of the seventh lens $L_7$ of the front group and the reduction-side concave surface of the eighth lens $L_8$ of the rear group, it is possible to suppress the occurrence of off-axis aberration, including distortion or lateral color.

In Table 4, there are shown a radius of curvature R (mm) of each lens surface of the two-group zoom projection lens, a center thickness of each lens and an air spacing (hereinafter, generally referred to as an on-axis plane spacing) D (mm) between the lenses, and a refractive index N and Abbe number ν value at the d-line of the lens. Note that the numerals in the table represent the order from the magnification side. Meanwhile, there are shown in the middle part of Table 4 the values of focal length f, back-focus distance bf, Fno. and angle-of-field 2ω.

TABLE 4

| Plane Number | R | D | $N_d$ | $ν_d$ |
|---|---|---|---|---|
| 1 | 151.190 | 3.01 | 1.77250 | 49.6 |
| 2 | −392.957 | 0.45 | | |
| 3 | 43.130 | 1.60 | 1.83400 | 37.2 |
| 4 | 16.590 | 5.10 | | |
| 5 | −118.627 | 1.26 | 1.71300 | 53.9 |
| 6 | 24.954 | 6.94 | | |
| 7 | 35.081 | 4.50 | 1.80518 | 25.4 |

TABLE 4-continued

| Plane Number | R | D | $N_d$ | $ν_d$ |
|---|---|---|---|---|
| 8 | 148.963 | 9.12-2.00 | | |
| 9 | 83.681 | 2.79 | 1.80610 | 40.9 |
| 10 | −83.681 | 4.14 | | |
| 11 | 35.068 | 3.15 | 1.56883 | 56.3 |
| 12 | −126.972 | 0.51 | | |
| 13 | −46.068 | 1.06 | 1.84666 | 23.8 |
| 14 | −278.791 | 12.25 | | |
| 15 | −87.240 | 0.99 | 1.80518 | 25.4 |
| 16 | 36.812 | 0.66 | | |
| 17 | 158.330 | 2.75 | 1.71300 | 53.9 |
| 18 | −33.385 | 0.20 | | |
| 19 | 58.777 | 2.49 | 1.69680 | 55.5 |
| 20 | −58.777 | 33.00-37.54 | | |
| 21 | ∞ | 3.00 | 1.48749 | 70.2 |
| 22 | ∞ | | | | f = 21.20-25.39, bf = 35.44, Fno = 2.41-2.67, 2ω = 55.57°-47.22°

| Conditional Expression (1) | Conditional Expression (2) | Conditional Expression (3) | Conditional Expression (4) |
|---|---|---|---|
| $n_{24}$ = 1.84666<br>$n_{25}$ = 1.80518 | 0.997 | 0.681 | 0.721 |

According to the two-group zoom projection lens in the embodiment 4, the conditional expressions (1) to (4) are satisfied as shown in the lower part of Table 4. Incidentally, the lens system is given an overall length of 63.0 mm.

Figure 8:
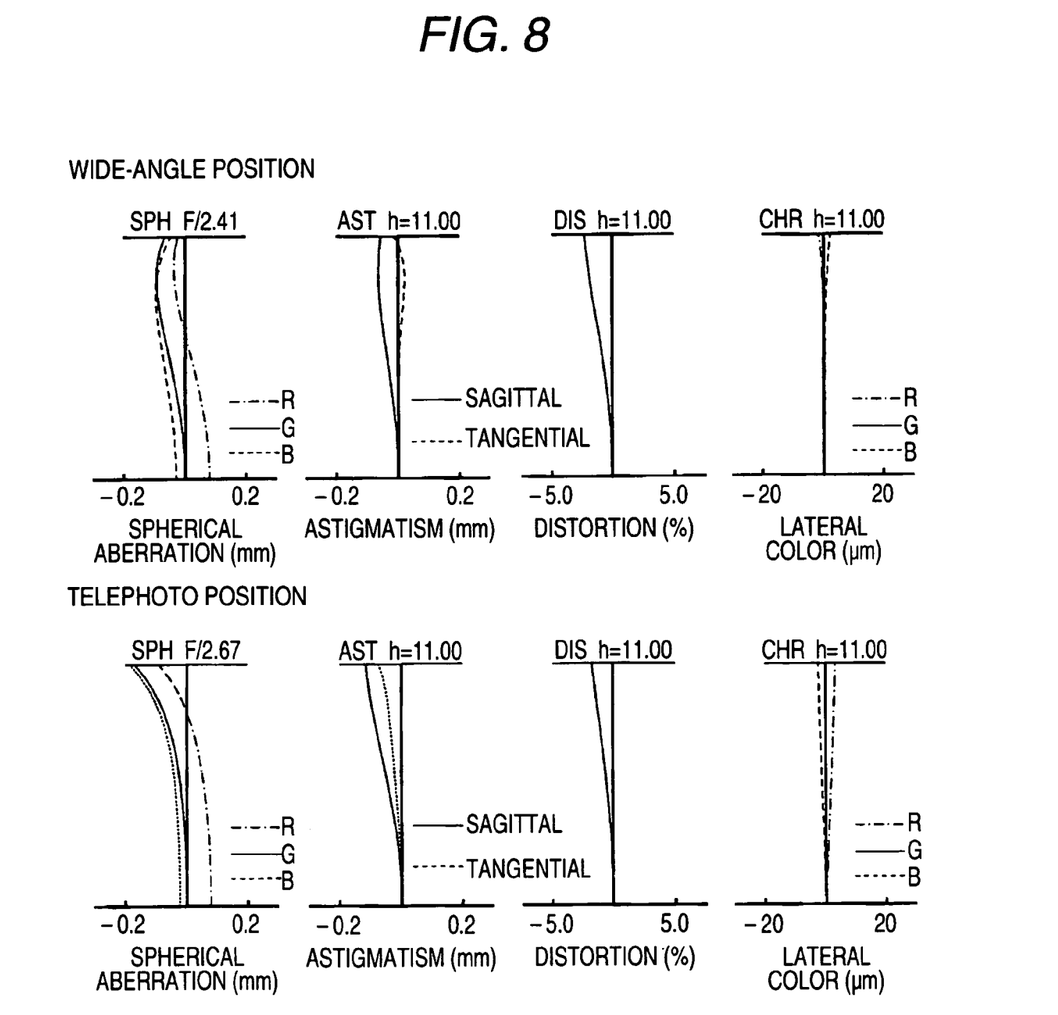
FIG. 8 is an aberration diagram illustrating aberrations (spherical aberration, astigmatism, distortion and lateral color) on the two-group zoom projection lens according to the exemplary 4.

FIG. 8 is an aberration diagram illustrating a spherical aberration, an astigmatism, a distortion and a lateral color on the two-group zoom projection lens according to the embodiment 4. Note that, in the astigmatism diagram, there is shown aberration as to sagittal and tangential image surfaces. In the aberration diagram, h designates an image height.

As apparent from the aberration diagram, the two-group zoom projection lens in the embodiment 4 is capable of making a favorable correction for aberrations, particularly lateral color.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

What is claimed is:

1. A two-group zoom projection lens comprising: in order from a magnification side, a first lens group having a negative refractive power; and a second lens group having a positive refractive power, the second lens group comprising a front group and a rear group in order from the magnification side, the front group comprising a group having at least two positive lenses and a group having at least one negative lens in order from the magnification side, the rear group comprising a group having at least one negative lens and a group having at least two positive lenses in order from the magnification side, wherein the at least one negative lens in the front group comprises a lens having a concave surface directed toward the magnification side, the at least one negative lens in the rear group comprises a lens having a concave surface directed toward a reduction side, and the two-group zoom projection lens satisfies conditional expressions (1) to (4):

$$n_{2i} > 1.75 \quad (1)$$

$$0.8 < D_2/f_2 < 1.2 \quad (2)$$

$$0.6 < f_w/f_2 < 0.8 \quad (3)$$

$$0.6 < f_w/|f_1| < 0.9 \quad (4)$$

wherein $f_1$ represents a focal length of the first lens group, $n_{2i}$ represents a refractive index with respect to a d-line of a glass material comprising the negative lenses in the second lens group and i is a lens number of at least 2 counted from the magnification side, $D_2$ represents an overall length of the second lens group, $f_2$ represents a focal length of the second lens group, and $f_w$ represents a focal length at a wide-angle end of the overall system of the two-group zoom projection lens.

2. The two-group zoom projection lens according to claim 1, wherein the first lens group comprises: in order form the magnification side, a first positive lens; a negative meniscus lens having a convex surface directed toward the magnification side; a first negative lens; a second positive lens; and a second negative lens.

3. The two-group zoom projection lens according to claim 1, wherein the first lens group comprises, in order from the magnification side, a first positive lens; a negative meniscus lens having a convex surface directed toward the magnification side; a negative lens; and a second positive lens.

4. A projection display comprising:
a light source;
a light valve;
an illumination optical section that guides a luminous flux from the light source to the light valve; and
a two-group zoom projection lens according to claim 1,
wherein the light valve optically modulates the luminous flux, and the two-group zoom projection lens projects the luminous flux onto a screen.

5. A two-group zoom projection lens comprising: in order from a magnification side,
a first lens group having a negative refractive power; and
a second lens group having a positive refractive power, the second lens group consisting of a front group and a rear group in order from the magnification side, and the front group includes a negative lens closest to the reduction side thereof and the rear group includes a negative lens closest to the magnification side thereof, wherein the front group comprises a group having at least two positive lenses and a group having at least one negative lens in order from the magnification side, the rear group comprises a group having at least one negative lens and a group having at least two positive lenses in order from the magnification side, wherein the at least one negative lens in the front group comprises a lens having a concave surface directed toward the magnification side, the at least one negative lens in the rear group comprises a lens having a concave surface directed toward a reduction side, and the two-group zoom projection lens satisfies conditional expressions (1) to (3):

$$n_{2i} > 1.75 \quad (1)$$

$$0.8 < D_2/f_2 < 1.2 \quad (2)$$

$$0.6 < f_w/f_2 < 0.8 \quad (3)$$

wherein $n_{2i}$ represents a refractive index with respect to a d-line of a glass material comprising the negative lenses in the second lens group and i is a lens number of at least 2 counted from the magnification side, $D_2$ represents an overall length of the second lens group, $f_2$ represents a focal length of the second lens group, and $f_w$ represents a focal length at a wide-angle end of the overall system of the two-group zoom projection lens.

6. A two-group zoom projection lens according to claim 5, wherein the lens closest to the reduction side of the front group has a concave surface directed toward the magnification side.

7. A two-group zoom projection lens according to claim 5, wherein the lens closest to the magnification side of the rear group has a concave surface directed toward the reduction side.

8. A projection display comprising:
a light source;
a light valve;
an illumination optical section that guides a luminous flux from the light source to the light valve; and
a two-group zoom projection lens according to claim 5,
wherein the light valve optically modulates the luminous flux, and the two-group zoom projection lens projects the luminous flux onto a screen.

* * * * *